E. DIXON.
TOP ROLL SADDLE LUBRICATOR.
APPLICATION FILED JUNE 26, 1914.
1,145,572.
Patented July 6, 1915.
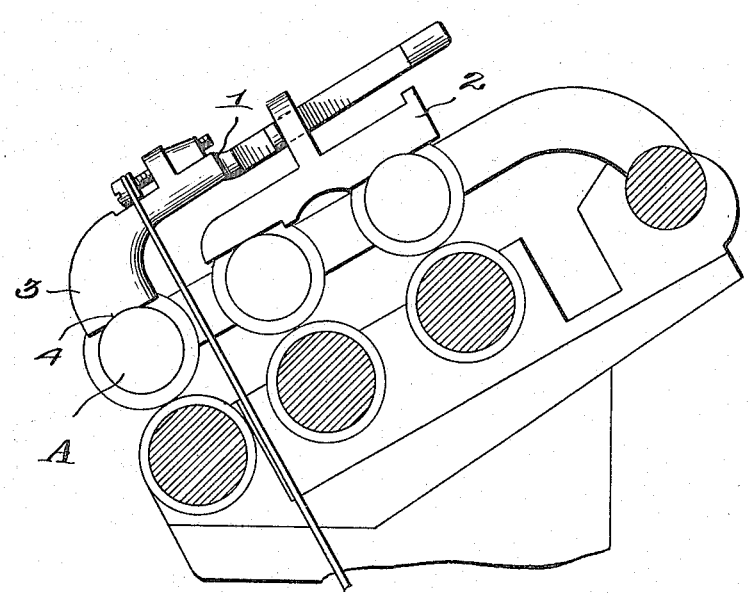
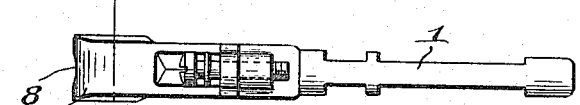
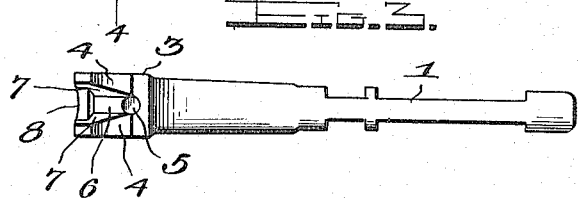
Witnesses
Inventor
Ezra Dixon
By Joseph A. Miller
Attorney

UNITED STATES PATENT OFFICE.

EZRA DIXON, OF BRISTOL, RHODE ISLAND.

TOP-ROLL-SADDLE LUBRICATOR.

1,145,572.

Specification of Letters Patent.

Patented July 6, 1915.

Application filed June 26, 1914. Serial No. 847,414.

*To all whom it may concern:*

Be it known that I, EZRA DIXON, a citizen of the United States, residing at Bristol, in the county of Bristol and State of Rhode Island, have invented a new and useful Improvement in Top-Roll-Saddle Lubricators, of which the following is a specification.

This invention relates to certain new and useful improvements in top roll saddle lubricators, and pertains more particularly to lubricating means for the bearing of the saddle, and while the invention is shown and described in connection with a top roll saddle, still it will be understood that it is applicable to other bearings which it is capable of being used in connection with.

The primary object of the invention is to provide a bearing in which the lubricant will be drawn, by the movement of the top roll, toward the center of the bearing, where same will be stored to thereby not only provide a constant feed of the lubricant to the roll, but to further economize in the use of the lubricant, and to also provide a feed which is not in excess of such proper amount of lubricant as suffices for the purpose.

Further and other objects of the invention are to provide a lubricating means which is of simple and economical structure, and which is incorporated within the bearing by simple hollowing out of the same, thus constituting an integral part of the bearing.

In the drawings—Figure 1 is a fragmentary side elevation, partly in section of a spinning machine, illustrating the present invention in connection with the top rolls thereof. Fig. 2 is a top plan view of the top saddle. Fig. 3 is a bottom plan view thereof, and Fig. 4 is an enlarged section on the line 4—4 of Fig. 2.

The top saddle 1 and the bottom saddle 2 may be removably and adjustably connected in any desired manner, and since, as hereinabove stated, the invention is applicable to bearings used in connection with other mechanisms, or the like, it is only necessary to understand the present invention to refer to the head 3 which the top saddle is provided with, and which provides a bearing that seats and rides on the roll A.

The under face of the bearing 3 is transversely grooved at 4 to conformably receive the upper arc of the roll A, and beyond the inner side of the groove is provided with a relatively deep well or reservoir 5 which provides a receptacle and storage medium for the lubricant. A channel 6 having its side walls flared outwardly from the reservoir 5, and also inclined toward each other in an upward direction, as depicted in Fig. 4, extends from the reservoir and communicates therewith, the widest or mouth portion of the channel being extended completely through the front or free end wall or face of the bearing. The front or free end wall of the bearing is provided with a slight cut-out part 8 which allows the lubricant to freely enter the channel during the rotation of the roll A.

In operation, since the bearing rests upon the shaft or top roll, the rotation of the latter will move the lubricant toward the reservoir 5, and through the channel 6, and since the walls 7 7 of the channel incline toward one another as the reservoir is approached, the lubricant will be resisted to a slight extent in its movement toward the reservoir, which assures supply of the lubricant to the shaft to an extent merely sufficient for the needs of the shaft. The cut-out part 8 will enable the lubricant to collect or will gather same and place the lubricant in communication with the channel from which latter it will enter the reservoir, as will be evident.

Obviously, the bottom saddle may be also provided with the lubricating means shown and described in connection with the top saddle.

Having thus described my invention, I claim as new and desire to secure by Letters Patent:—

1. In a lubricator, a bearing for seating engagement on top of a shaft, said bearing being grooved to conformably receive the shaft, and having a reservoir formed on its under face which opens downwardly and further being formed with a channel which extends from the reservoir through the front wall of the bearing, which channel has its side walls flared outwardly from the reservoir and further flared upwardly in cross-section, the front wall of the bearing having a cut-out part which establishes communication with the channel and with the shaft.

2. In a lubricator, a bearing for seating engagement on top of a shaft and having a reservoir on its under face which opens down on the shaft, said bearing also having a V-shaped channel on its under face the point of which communicates with the reservoir and a cutout portion formed in the major end of the channel.

3. In a lubricator, a bearing for seating engagement on top of a shaft having a reservoir on its under face which opens down on the shaft and also having an open ended channel which leads from the reservoir through the front face of the bearing.

4. In a lubricator, a bearing for seating engagement on top of a shaft having a flared channel on its under face which overlies the shaft and which has its widest end pointing in a direction opposite to the direction of the shaft, the side walls of said channel being downwardly and outwardly inclined, as and for the purpose set forth.

5. A bearing for engagement with a shaft having a reservoir and a channel extending longitudinally of the bearing, said channel having one end communicating with the reservoir, the other end of said channel having a cut-out part and disposed above the plane of the top wall of said channel.

In testimony whereof I have signed my name to this specification in the presence of two subscribing witnesses.

EZRA DIXON.

Witnesses:
ADA E. HAGERTY,
J. A. MILLER.

Copies of this patent may be obtained for five cents each, by addressing the "Commissioner of Patents, Washington, D. C."